(12) United States Patent
Ali

(10) Patent No.: US 7,297,283 B2
(45) Date of Patent: Nov. 20, 2007

(54) CONTAINER HAVING FLUID PURIFICATION SYSTEM

(75) Inventor: Aslam Mohamed Ali, Cupertino, CA (US)

(73) Assignee: Yakima Filters, Inc., Cupertino, CA (US)

( * ) Notice: Subject to any disclaimer, the term of this patent is extended or adjusted under 35 U.S.C. 154(b) by 0 days.

(21) Appl. No.: 11/299,038

(22) Filed: Dec. 9, 2005

(65) Prior Publication Data

US 2007/0131617 A1    Jun. 14, 2007

(51) Int. Cl.
| | |
|---|---|
| B01D 61/00 | (2006.01) |
| B01D 39/00 | (2006.01) |
| B01D 35/00 | (2006.01) |
| C02F 9/00 | (2006.01) |
| B01D 37/00 | (2006.01) |
| C02F 1/00 | (2006.01) |

(52) U.S. Cl. .................. 210/767; 210/501; 210/502.1; 210/282; 210/257.2; 210/85

(58) Field of Classification Search ............ 210/501.2, 210/500.27, 257.2, 455, 464, 473, 244, 484, 210/767, 650, 282, 501, 198.2, 85
See application file for complete search history.

(56) References Cited

U.S. PATENT DOCUMENTS

| | | | |
|---|---|---|---|
| 1,774,004 A | 8/1930 | Haslett | |
| D148,165 S | 12/1947 | Hornan | |
| 3,430,769 A | 3/1969 | Sanzenbacher | |
| 3,631,793 A | 1/1972 | Bednartz | |
| 3,861,565 A | 1/1975 | Rickmeier | |
| 3,872,012 A * | 3/1975 | Endicott | 210/297 |
| 3,872,013 A * | 3/1975 | Nishino et al. | 210/317 |
| 3,954,545 A * | 5/1976 | Hamisch, Jr. et al. | 156/384 |
| 4,046,495 A | 9/1977 | Grimm, Jr. | |
| D249,275 S | 9/1978 | Mackay et al. | |
| 4,151,092 A | 4/1979 | Grimm et al. | |
| 4,160,728 A * | 7/1979 | Kirkland et al. | 210/656 |
| 4,477,347 A | 10/1984 | Sylva | |
| 4,529,511 A | 7/1985 | Breeden et al. | |
| 4,714,550 A | 12/1987 | Malson et al. | |
| D295,888 S | 5/1988 | Schulein et al. | |
| 4,764,274 A | 8/1988 | Miller | |
| 4,776,956 A | 10/1988 | Gannaway | |
| 4,824,565 A | 4/1989 | Middleton | |
| 4,828,692 A | 5/1989 | Peranio | |
| 4,895,648 A | 1/1990 | Hankammer | |
| 4,902,411 A | 2/1990 | Lin | |
| 4,948,499 A | 8/1990 | Peranio | |
| 4,969,996 A | 11/1990 | Hankammer | |

(Continued)

Primary Examiner—Ana Fortuna
(74) Attorney, Agent, or Firm—Chinh H. Pham; Greenberg Traurig, LLP

(57) ABSTRACT

A container for removing particulates and/or contaminants, including impure compounds and elements from fluid to be treated is provided. The container can include a compartment within which a volume of fluid to be treated may be received, a chamber into which a volume of treated fluid from the compartment may be accommodated, a cover for placement across an upper end of the container, so as to prevent fluid from within the chamber from spilling, and a porous matrix, positioned within the compartment and having a nanostructured adsorption material for trapping and retaining, within its pores, particles and contaminants in the fluid. A method for removing particulates and contaminants is also provided.

31 Claims, 5 Drawing Sheets

U.S. PATENT DOCUMENTS

| | | | |
|---|---|---|---|
| 4,998,228 A | 3/1991 | Eger et al. | |
| 5,006,267 A * | 4/1991 | Vaughn et al. | 210/755 |
| 5,009,364 A | 4/1991 | Bolte | |
| D319,864 S | 9/1991 | Geneve et al. | |
| D321,550 S | 11/1991 | Laughlen et al. | |
| D321,745 S | 11/1991 | Murrell | |
| 5,071,551 A * | 12/1991 | Muramatsu et al. | 210/266 |
| 5,076,922 A | 12/1991 | DeAre | |
| 5,078,874 A | 1/1992 | Sullivan | |
| D323,874 S | 2/1992 | Hirman et al. | |
| D323,875 S | 2/1992 | Kang et al. | |
| D325,768 S | 4/1992 | Hankammer | |
| 5,102,547 A * | 4/1992 | Waite et al. | 210/501 |
| 5,122,272 A | 6/1992 | Iana et al. | |
| D331,446 S | 12/1992 | Gidman | |
| 5,167,819 A | 12/1992 | Iana et al. | |
| 5,190,643 A | 3/1993 | Duncan et al. | |
| D335,239 S | 5/1993 | Crunden et al. | |
| 5,211,973 A | 5/1993 | Nohren, Jr. | |
| D336,760 S | 6/1993 | Raunkjaer | |
| D337,691 S | 7/1993 | Raunkjaer | |
| 5,225,078 A | 7/1993 | Polasky et al. | |
| D339,023 S | 9/1993 | De Coster | |
| 5,273,649 A | 12/1993 | Magnusson et al. | |
| D343,673 S | 1/1994 | Bannigan | |
| D348,305 S | 6/1994 | Bannigan | |
| 5,328,597 A | 7/1994 | Boldt, Jr. et al. | |
| 5,342,528 A * | 8/1994 | Adachi et al. | 210/668 |
| D356,004 S | 3/1995 | VanValkenburg et al. | |
| D360,334 S | 7/1995 | Garza, Jr. | |
| D360,929 S | 8/1995 | Albertson | |
| D362,583 S | 9/1995 | Weber et al. | |
| D363,760 S | 10/1995 | Morem et al. | |
| D370,051 S | 5/1996 | Samson et al. | |
| 5,518,613 A | 5/1996 | Koczur et al. | |
| 5,536,394 A | 7/1996 | Lund et al. | |
| 5,536,396 A | 7/1996 | Mudra et al. | |
| 5,560,939 A | 10/1996 | Nakagawa et al. | |
| 5,562,824 A | 10/1996 | Magnusson | |
| 5,569,374 A | 10/1996 | Williams | |
| 5,594,070 A * | 1/1997 | Jacoby et al. | 525/88 |
| 5,638,991 A | 6/1997 | Todden et al. | |
| D381,858 S | 8/1997 | Richaud | |
| 5,688,588 A | 11/1997 | Cotton et al. | |
| D386,943 S | 12/1997 | Demore et al. | |
| D386,944 S | 12/1997 | Demore et al. | |
| 5,709,870 A * | 1/1998 | Yoshimura et al. | 424/404 |
| 5,733,448 A | 3/1998 | Kaura | |
| 5,785,844 A | 7/1998 | Lund et al. | |
| D398,366 S | 9/1998 | Ulery et al. | |
| 5,811,004 A | 9/1998 | Robertson et al. | |
| D400,392 S | 11/1998 | Robertson et al. | |
| D400,755 S | 11/1998 | Ferlin, Jr. | |
| 5,830,360 A | 11/1998 | Mozayeni | |
| 5,846,418 A | 12/1998 | Thompson et al. | |
| 5,869,013 A * | 2/1999 | Tabata et al. | 423/239.2 |
| 5,873,995 A | 2/1999 | Huang et al. | |
| 5,882,507 A | 3/1999 | Tanner et al. | |
| 5,900,143 A | 5/1999 | Dalton et al. | |
| 5,928,506 A | 7/1999 | Bae | |
| 6,136,189 A * | 10/2000 | Smith et al. | 210/266 |
| 6,254,768 B1 | 7/2001 | Dulieu et al. | |
| 6,602,406 B1 * | 8/2003 | Nohren et al. | 210/136 |
| 6,652,751 B1 * | 11/2003 | Kutowy et al. | 210/500.27 |
| 6,653,878 B2 * | 11/2003 | Nolan | 327/170 |
| 6,986,429 B2 * | 1/2006 | Naji et al. | 210/501 |
| 6,989,101 B2 * | 1/2006 | Cumberland et al. | 210/660 |

* cited by examiner

CONTAINER HAVING FLUID PURIFICATION SYSTEM

FIELD OF THE INVENTION

The present invention relates to fluid purification systems, and more specifically, to containers having a nanostructured adsorption material for removing particulates and/or contaminants from fluid.

RELATED ART

Water quality has recently become a major concern for many people whether it is for life style reasons or health reasons. The public has become aware of the potential negative health effects associated with chlorination for disinfecting water, as well as the presence of trace quantities of heavy metals, such as lead, copper and zinc or particulates, including impure compounds, elements, and other contaminants exceeding the prescribed limits that is intended for human consumption. Moreover, consumers are increasingly seeking out better tasting water than what the local municipal water supply can provide. Consumers searching for an alternative source for substantially pure or better tasting water have caused a tremendous increase in the consumption of commercial bottled water recently, pushing sales into the billions of dollars per year.

To combat the high costs of bottled water, many are turning to a variety of water filtration products. The most popular styles being the pour through carafe. These pour through carafes are often pitcher-like in design and are made to be easily handled. They can usually hold from one to two liters of water and can be tipped for pouring. Other designs have been made available over the years to remove particulates, including impure compounds and elements, and/or contaminants from fluid.

U.S. Pat. No. 703,654 discloses a canteen having two separate chambers enclosed within the canteen for filtered and unfiltered water. A filtering media is placed between the two chambers and an air-pump is connected to the chamber for unfiltered water. The air-pump is used to force unfiltered water through the filtering media into the chamber for filtered water.

The U.S. Pat. No. 4,800,018 discloses a simplified portable water purification system that provides an unfiltered water receiving compartment, a disposable filter cartridge, and a filtered water reservoir all in a single container. The disposable filter cartridge is horizontally positioned centrally and divides the container into the two compartments. Contaminated and unfiltered water is poured into the top receiving compartment of the container and is allowed to pass through filtering materials in the disposable filter cartridge into the reservoir below.

The U.S. Pat. No. 5,149,437 discloses a device that includes a filter housing having an inlet at one end for water to be purified and an outlet for purified water at an opposing end. The filter device including in sequence first, second and third layers of purification material. The first layer of purification material includes metallic particles for establishing a suitable redox potential in the first layer. The second layer of purification material includes activated carbon. The third layer of purification material includes a weak acid ion exchange resin.

The U.S. Pat. No. 5,186,830 discloses an apparatus filtering drinking water which includes a lower non-porous container to receive the filtrate. An upper vessel closed at its lower end by a high density ceramic filter is stacked in nested relationship to the lower container. When water containing contaminants and pollutants is poured into the filter vessel, it drips through the ceramic filter under gravitational forces and is stored in the lower receptacle.

The U.S. Pat. No. 5,562,824 discloses a gravity percolation water purifier assembly. The assembly includes a covered storage container having a dispensing spigot. A flanged filtration chamber is supported beneath the cover to receive untreated water. A porous filter cartridge is sealed to an outlet port. A purifier cartridge is threaded to the outlet port and supports multiple fibrous spacers and treatment chambers containing beds of treatment media, including a multivalent iodine media, granular activated carbon, and a halogen scavenger media. In one purification cartridge, water passes from multiple inlet ports at an inlet bore through adjoining centric chambers and to the storage container via outlet ports at the periphery of the purifier cartridge.

The U.S. Pat. No. 5,733,448 discloses a container having two chambers separated by a filter. One of the chambers is capable of being compressed so as to pressurize a volume of water to be filtered in the chamber. Upon applying pressure, the water is forced through the filter into the second chamber where it is stored for use in a clean and drinkable form. The filter includes a series of discs arranged to effectively remove particulate, chemical and other undesired contents of the water. The filtered water may be filtered to the molecular level providing an essentially sterile drinking water.

The U.S. Pat No. 6,117,332 discloses a feeder insert for a tubular water filtration cartridge utilized in household point of use water filtration systems. The feeder insert allows a chemical to be fed into a incoming water supply at a controlled rate by employing a bypass system that allows a predetermined amount of incoming water to flow past the feed chemical without contacting the chemical. The amount of water in the bypass flow can also be manually adjusted through the use of two adjustment mechanisms, an adjustable ring and a rotatable end cap, located on the feeder insert.

The U.S. Pat. No. 6,344,146 discloses an integrated water purification device which includes a receptacle modified to accommodate a filtration assembly for purifying water, and to store water following purification. The receptacle provides separate openings for water intake, and water outflow. The filtration assembly includes a pump and a multistage filter cartridge. Pump action draws water into the water purification device and forces the water though the multistage filter and into the receptacle. Purified water may be stored in the receptacle until consumption.

The U.S. Pat No. 6,733,669 discloses a water purification system having a watertight polymeric container having an upper unfiltered water receiving chamber and a lower filtered water chamber. A disposable filter cartridge is provided between the chambers. This allows for gravity induced filtering through cartridge as opposed to pressure induced filtering.

The above referenced systems are designed to filter water by way of a flow-through process utilizing either gravity or pressure. In addition, with these systems, a mechanism is not readily available to determine the level of particulates removed by the filter, as well as whether the filter can still remove particulates. Accordingly, it is desirable provide a system for removing particulate from water that not only can display the level of contaminants removed, but whether contaminants can still be removed by a particulate removal mechanism.

SUMMARY OF THE INVENTION

The invention described herein relates to a container designed for purification of fluid for consumption by removing contaminants, such as microorganisms, organic, inorganic, and particulate matters from the fluid. In one embodiment of the present invention, the container includes a compartment into which a volume of fluid to be treated may be placed, and a chamber for receiving treated fluid from the compartment. The container may also include a porous matrix positioned within the compartment for entrapment of the particulates and/or contaminants upon surface contact between the fluid and the porous matrix. In one embodiment, the porous matrix includes a nanostructured adsorption material and may be embedded on the interior surface of the receptacle. Alternatively, the porous matrix may be placed onto the interior surface of the receptacle as a thin film, coating, layer or as a sheet of material. The container may further include a sensor in communication with the porous matrix, so as to detect levels of particulates and/or contaminants adsorbed on the matrix or quantity of particulates and/or contaminants removed from the fluid to be treated.

The present invention also provides a method for purification of fluid by removing unwanted particulates and/or contaminants from a fluid. In one embodiment, a compartment for accommodating a fluid to be treated may be provided. A porous matrix having nanoscaled pores may be placed within the compartment. A chamber for receiving the treated fluid from the compartment may be positioned in alignment the compartment. The fluid to be treated may next be introduced into the compartment. Thereafter, movement of the fluid within the compartment may be initiated, for example, as it drains into the chamber. Upon surface contact between the fluid and the porous matrix, the particulates and/or contaminants may be directed within the porous matrix and trapped therein. If there is no movement of fluid within the compartment, the contaminants may still removed by slow molecular displacement or diffusion into the porous matrix. In an embodiment, levels of contaminants removed from the fluid may be indicated, as well as whether the ability of the porous matrix to remove additional contaminants has been exhausted.

BRIEF DESCRIPTION OF THE DRAWINGS

The invention is explained in greater detail below with reference to an exemplary embodiment that is illustrated in the accompanying FIGS.

DETAILED DESCRIPTION OF SPECIFIC EMBODIMENTS

The present invention provides, in one embodiment, a container having a filtration system designed to purify fluid to be consumed. In particular, the filtration system acts to remove particulates, such as impure and undesirable constituents, contaminants, such as microorganisms, biological contaminants, organic and inorganic compounds and elements, and/or matters or substances ranging from about 1 nanometer (nm) to about 100 nm or larger from a fluid, for instance water, so that the resulting treated or purified fluid will be safe to consume. In other words, the purified or treated fluid is provided with a level of contaminants not exceeding the prescribed limit intended for human consumption.

Figure 1A:
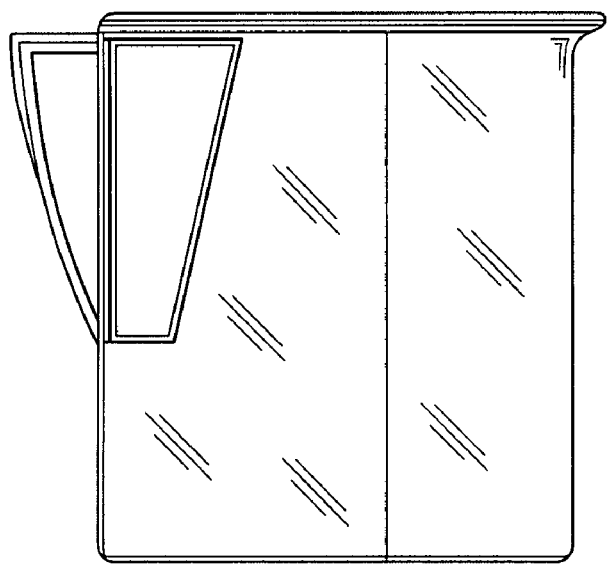
FIG. 1A illustrates a side view a container having a filtration compartment for removing contaminants from fluid in accordance with one embodiment of the present invention.
Figure 1B:
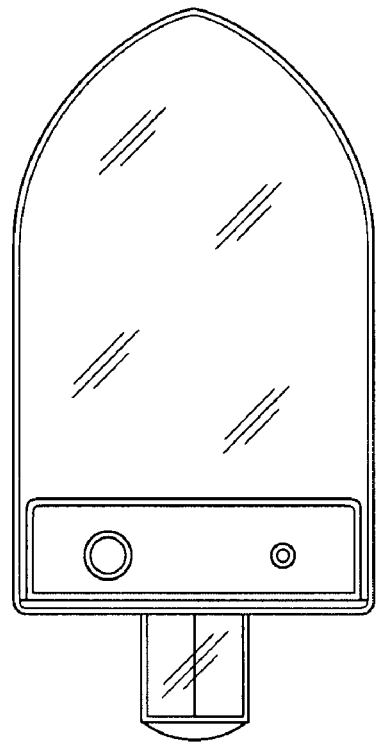
FIG. 1B illustrates a top view of the container shown in FIG. 1A.

In FIGS. 1A-B, there is shown a container 10 having a compartment 11 within which a volume of fluid to be treated may be placed, and a chamber 12 into which a volume of treated fluid may exit from the compartment 11 and be accommodated therein. The compartment 11, in an embodiment, may be positioned within the chamber 12 against a wall 13 of container 10. To receive fluid to be treated, the compartment 11 may be provided with an inlet end 111. Inlet end 111, in one embodiment, may be an opening 112 of any size and/or shape, so long as it is capable of permitting fluid to be treated to be introduced into the compartment 11. The compartment 11 may also be provided with an outlet end 113 spatially positioned below the inlet end 111 of the compartment 11. The outlet end 113, in accordance with an embodiment of the present invention, may be designed to permit treated fluid from the compartment 11 to drain from the compartment 11 into the chamber 12 of container 10. To this end, the compartment 11, in an embodiment, may be sufficiently spaced from a bottom end 14 of container 10. However, to minimize the rate of outflow of fluid from the compartment 11 prior to its treatment, outlet end 113 may be designed in such a manner so as to permit the fluid to remain within the compartment 11 for a period of time sufficient for treatment. In one embodiment, outlet end 113 may include at least one opening 114. Alternatively, outlet end 113 may include a plurality of openings 114 or a perforated surface (not shown). To the extent desired, the opening or openings 114 may be provided with any geometric shape or may be positioned relatively to one another in any manner, so long as the fluid can remain within the compartment 11 for a sufficient amount of time for treatment. Moreover, if desired, a plate (not shown) may be situated across the outlet end 113 to prevent fluid from draining from the compartment 11 until the plate is removed. To that end, the length of time over which the fluid may be treated within the compartment 11 may be controlled.

Figure 7:
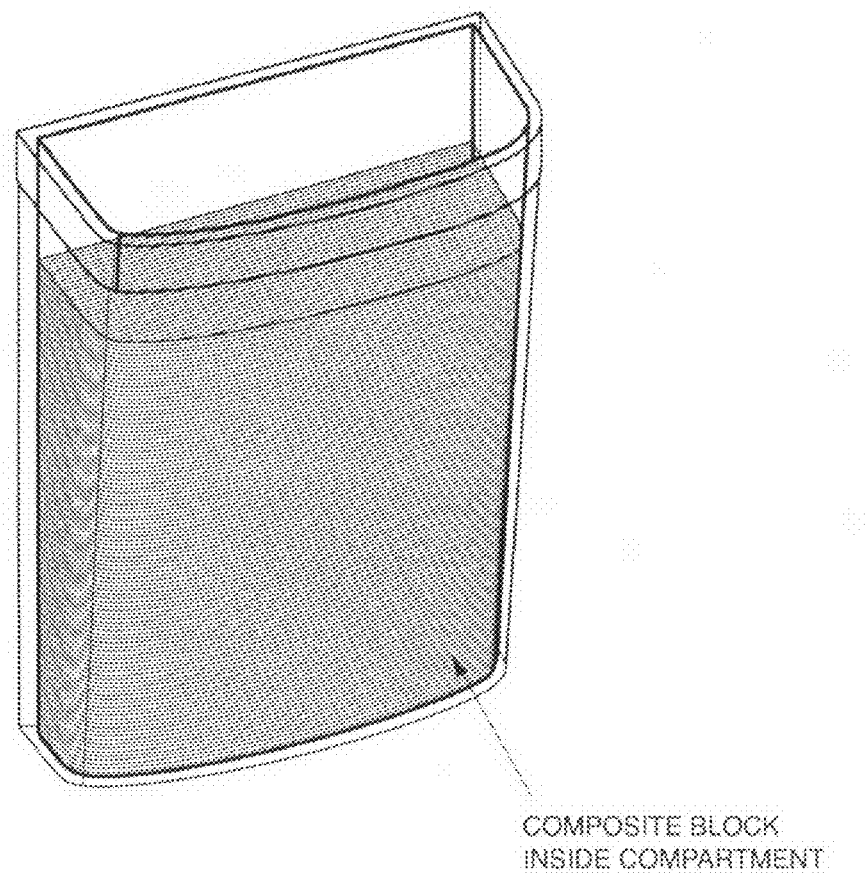
FIG. 7 illustrates a variation on the block matrix and the compartment of the present invention.

To facilitate migration of treated fluid from within the compartment 11 toward outlet end 113, the compartment 11 may be designed, in an embodiment, to taper from the inlet 111 towards the outlet end 113, as shown in FIG. 1A. In this manner, as treated fluid drains from the compartment 11 across opening 114 at the outlet end 113 into chamber 12, the taper design may also minimize the amount of treated fluid remaining within the compartment 11. Of course, other designs may be employed when designing the compartment 11, such as that illustrated in FIG. 7.

Figure 2A:
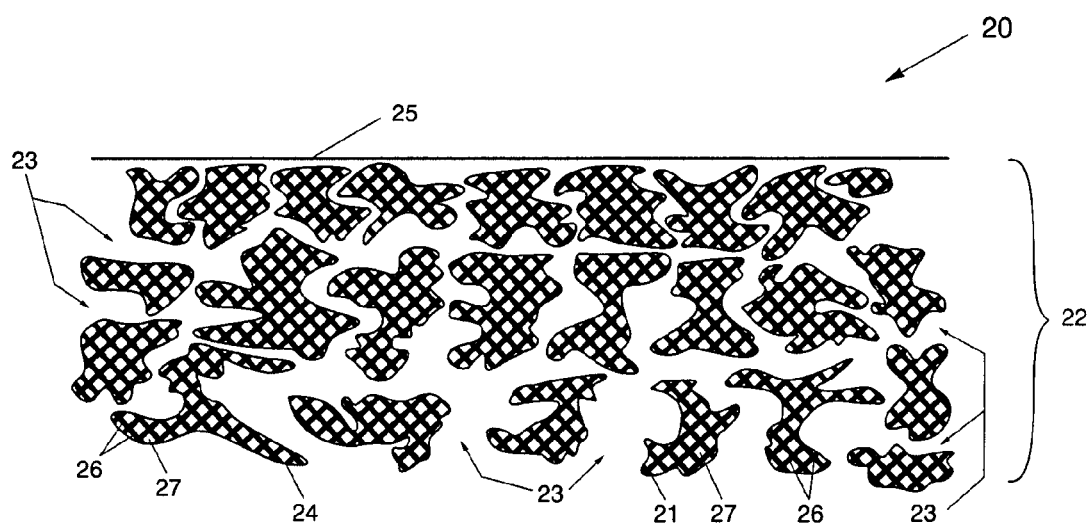
FIGS. 2A-B illustrate a cross sectional view of various porous matrices for use in connection with the present invention.
Figure 2B:
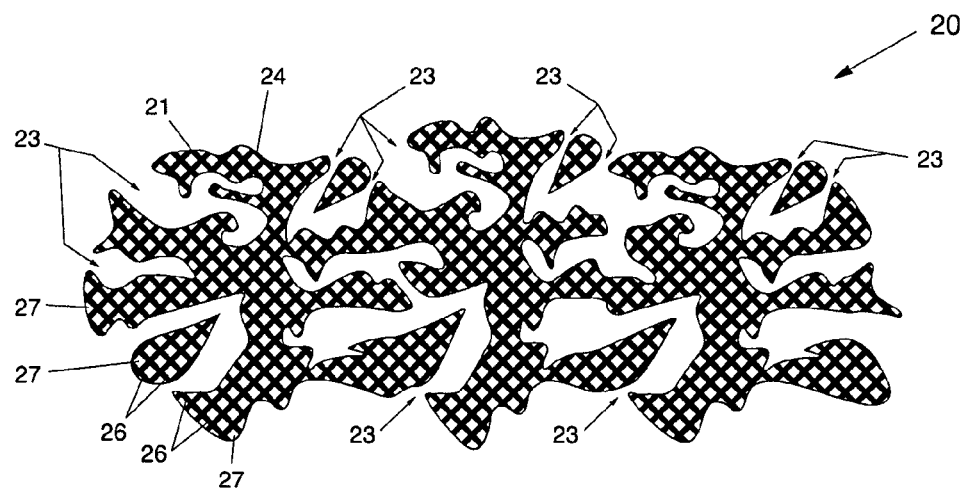

To treat the fluid within the compartment 11, the system 10 may include, in one embodiment, a porous matrix 20, such as that illustrated in FIGS. 2A and 2B, positioned within the compartment 11 along its interior surfaces for the removal of particulates and/or contaminants from the fluid. In accordance with one embodiment of the present invention, porous matrix 20 may include a nanostructured adsorption material 21 having a large volume of pores 23. In addition, the porous matrix 20 may be provided with a fluid contact surface 24 against or across which fluid within the chamber 12 may flow, and a substantially fluid impermeable surface 25 across which fluid within the porous matrix 20 and chamber 12 cannot pass. Pores 23, in one embodiment, may be nanoscale in size, ranging from about 1 nanometer (nm) to about 100 nm. In this manner, particles and/or contaminants ranging from about 1 nm to about 10 nm or larger can be removed from the fluid. The pores 23 may include a total volume ranging from about 0.5 $cm^3/g$ to about 1.0 $cm^3/g$. In a preferred embodiment, the total volume of pores 23 may range from about 0.8 $cm^3/g$ to about 0.95 $cm^3/g$, with a total specific surface area ranging from at least approximately 1000 $m^2/g$ to approximately 3000 $m^2/g$, and higher.

As illustrated in FIG. 2A, the nanostructured adsorption material 21 may include, in one embodiment, a plurality of layers 22, each having pores 23 within a predetermined size range. In such an embodiment, layers 22 may be arranged so that the pores 23 in each successive layer 22 get successively smaller in size, moving from the layer immediately adjacent the contact surface 24 to the layer immediately adjacent the substantially impermeable surface 25. In this manner, smaller particulates and/or contaminants may be permitted to move through the larger pores adjacent the contact surface 24 and into the smaller pores adjacent the substantially impermeable surface 25 where they can be trapped and retained.

Alternatively, as illustrated in FIG. 2B, the nanostructured adsorption material 21 may be designed without distinctive layers 22, such that pores 23 of various nanoscale size ranges may be interspersed throughout the entire nanostructured adsorption material 21. Although not illustrated, it should be appreciated that the nanostructured adsorption material 21 may be provided with a plurality of layers as shown in FIG. 2A, while each layer may include pores 23 of various nanoscale size ranges interspersed therein, similar to those in FIG. 2B.

The porous matrix 20 used in connection with the system 10 of the present invention may, in one embodiment, be formed from, for instance, porous char generated from various starting materials, for example, discarded or used automobile tires or other materials that can generate a relatively high fixed carbon content within the porous char. Of course, new automobile tires or similar starting materials may also be used to generated the porous char. In one embodiment, the starting materials may be heated in a reactor, within which the environment may be controlled, initially from room temperature to about 250° C. to 300° C. During this initial heating period, a mixture of condensable and non-condensable gases may be given off from the starting material within the reactor. This mixture of gases, which can be captured for reintroduction at a later stage, can typically include approximately 25%-35% carbon dioxide, approximately 10%-15% carbon monoxide, approximately 5%-10% methane, approximately 1%-5% volatile acids, with the remaining portion containing a mixture of hydrogen, oxygen, hydrocarbons, i.e., organic materials.

Upon the reaching between 250° C. to 300° C., an exothermic reaction can occur within the reactor pushing the temperature of the reactor and thus the resulting porous char to temperatures ranging from about 500° C. to about 600° C. During this period, the previously captured condensable and non-condensable gases may be reintroduced into the reactor for exposure to the porous char. The resulting porous char may contain, at this stage, mostly macro-pores and may only be moderately dense in nature. To subsequently obtain a nanostructured adsorption material, this moderately dense porous char must be transformed to a relatively high-density material with a relatively high fixed carbon content.

To generate a relatively high fixed carbon content in the porous char, impurities present in the starting materials, and in the transformed material, i.e., porous char, may be removed, using known procedures, at various stages during the conversion process to produce a fixed carbon content in the porous char of greater than about 90% to about 95%. It should be noted that, on average, approximately 20 pounds of starting material, e.g., used tires, will yield about 4 pounds of porous char with a fixed carbon content of between 90% to 95%. Once the condensable and non-condensable gases have been reintroduced into the reactor, the temperature within the reactor may be increased so that the porous char may be heated at a relatively high temperature range of from about 1000° C. to about 1100° C. to enlarge the pores within the porous char. During this stage, a controlled mixture of steam and air may be introduced into the reactor. In one embodiment, for approximately 1 pound of porous char, from about 1.0 pound to about 1.5 pounds of steam and air mixture may be injected into the reactor. The amount of steam and air may vary depending upon how much the pores within the porous char are to be enlarged, and could vary from about 0.5 pounds to over 2.0 pounds per pound of porous char. The introduction of steam and air into the reactor, in one embodiment, can generate a producer gas in the presence of the hot porous char. The content of the producer gas may vary, but can contain about 15%-20% hydrogen, 20%-25% carbon monoxide, with the remainder a mixture of nitrogen, hydrocarbons and other organic materials.

By exposing the porous char to such a temperature range and a mixture of steam and air, the porous char may be transformed into a relatively high density nanostructured material having the desired porosity. Typically, approximately 1 pound of the high density nanostructured material can be generated from the 4 pounds of the porous char. The exposure of the porous char to such high temperature, in addition to enlarging and generating pores of various nanoscale sizes, can provide the resulting nanostructured adsorption material with internal surface areas ranging from at least approximately 1000 $m^2/g$ to approximately 3000 $m^2/g$, and higher.

The resulting nanostructured material, similar to nanostructured adsorption material 21 shown in FIGS. 2A-B, may be used in connection with the porous matrix 20 of the present invention. It should be noted that the process of enlarging the pores structure to specific nanoscale ranges, along with the removal of impurities within the porous char can impart special properties to the nanostructured material. In particular, such a process can impart the nanostructured material with adsorption properties necessary for removal of particulates and contaminants.

In addition to the size of the nanoscale pores, the ability of nanostructured material to adsorb particulates and contaminant molecules can also be dependent upon the structure of the nanoscale pores, the total surface area, the carbon particle size, and the void space between carbon particles. Specifically, as the nanostructured adsorption material, such as item 21 in FIGS. 2A and 2B, essentially comprises nanocarbon particles 26, the spaces 27 between these nanocarbon particles must be sufficiently small, i.e., nanoscale in size and smaller than the molecules of the fluid, so as to facilitate the fluid going through the pores 23 within the nanoadsorption material 21 and not through spaces around the pores 23. Likewise, should the carbon particles be larger than nanoscale size, such large carbon particles may block, partially block, and/or create interference with the flow of the fluid into the pores 23, thus allowing fluid to flow away from the pores 23. As a result, particulates and/or contaminants within the fluid flow may escape entrapment within the pores 23.

It should be appreciated that since one surface 25 of the porous matrix 20 is substantially impermeable to fluid, the porous matrix 20 of the present invention does not have flow-through properties similar to commercially available filters. Rather, fluid flowing against or across the contact surface 24 will enter and exit along the contact surface 24. Specifically, fluid flowing against or across the contact surface 24 into the nanostructured adsorption material 21 cannot thereafter exit through surface 25. In the presence of the impermeable surface 25, the fluid directed into one opening of a pore 23 adjacent the impermeable surface 25 may subsequently be allowed to flow out another opening of pore 23 not blocked by the impermeable surface 25, as illustrated by the arrows in FIGS. 2A and 2B, and eventually make its way out through the contact surface 24. Impermeable surface 25, in one embodiment of the present invention, may be generated by applying a layer of a substantially fluid impermeable material to one surface of the porous matrix 20.

The porous matrix 20 may further, in accordance with an embodiment of the present invention, be impregnated with, for instance, silver or silver compound(s) so as to minimize microbial growth within the porous matrix 20. In particular, the nanostructured adsorption material 21 may be treated with a silver compound in the presence of acid or alkaline materials, depending on the silver compound used, so that the silver compound can be substantially evenly distributed against internal surfaces of pores 23. Since this process can generate undesirable materials during the chemical reactions, such materials can be removed, in one embodiment, by leaching. The process employed herein can enhance the properties of the porous matrix 20. In addition to removal of particulates and contaminants, the presence of the silver compound, as noted, can minimize microbial growth within the porous matrix 20. Furthermore, it should be noted that the silver content provided within the porous matrix 20 using the process described herein may be at a level far below the permissible limits of silver in drinking water. In an embodiment, the silver content may be approximately 1 percent by weight. Additionally, the process employed herein can minimize the leaching of the silver content from within the porous matrix 20. In this manner, the presence of the silver compound within the porous matrix 20 does not act to elevate the level of silver above permissible limits.

In addition to or instead of silver or silver compound, the porous matrix 20 may include copper, zinc and/or other compounds such as ferric oxide within the pores 23, so as to, for instance, aid in the killing of microorganisms and viruses, and aid in the removal of inorganic contaminants.

Figure 3:
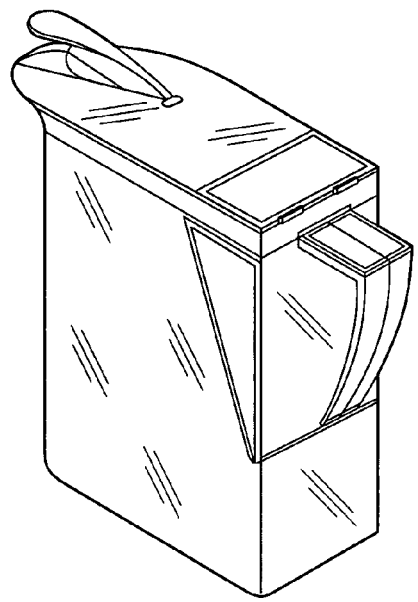
FIG. 3 illustrates a perspective view of the container shown in FIG. 1A.

With reference now to FIG. 3, the container 10, in one embodiment, may include, across its upper end 31, a lid 32 to prevent spilling of fluid from within the chamber 12. The lid 32, in one embodiment, may be a snap-on cover, may be hingedly connected to the container 10, or may be any other design, for instance, extruded to be integral with the container 10, so long as it can operate to prevent fluid from spilling from within the chamber 12. To facilitate removal of treated fluid from within the chamber 12, lid 32 may, in an embodiment, be designed to include an spout 33 through which fluid can exit. Spout 33, as illustrated in FIG. 3, may include a movable cap 34 to seal spout 33 and minimize unwanted spilling of fluid from within the chamber 12 therethrough. In an embodiment, cap 34 may be hingedly attached to lid 32. Cap 34 may also be a snap on cap. Alternatively, spout 33 may be designed without a cap 34. Similarly, to facilitate addition of fluid to be treated into the compartment 11, lid 32 may be provided with a movable cover 35 positioned substantially over a location at which the compartment 11 may be situated within the chamber 12. Cover 35, in one embodiment, may be hingedly coupled to lid 32. Cover 35 may, in an alternate embodiment, be a snap-on cover, or may be of any design that can facilitate easy access to the compartment 11.

Figure 4:
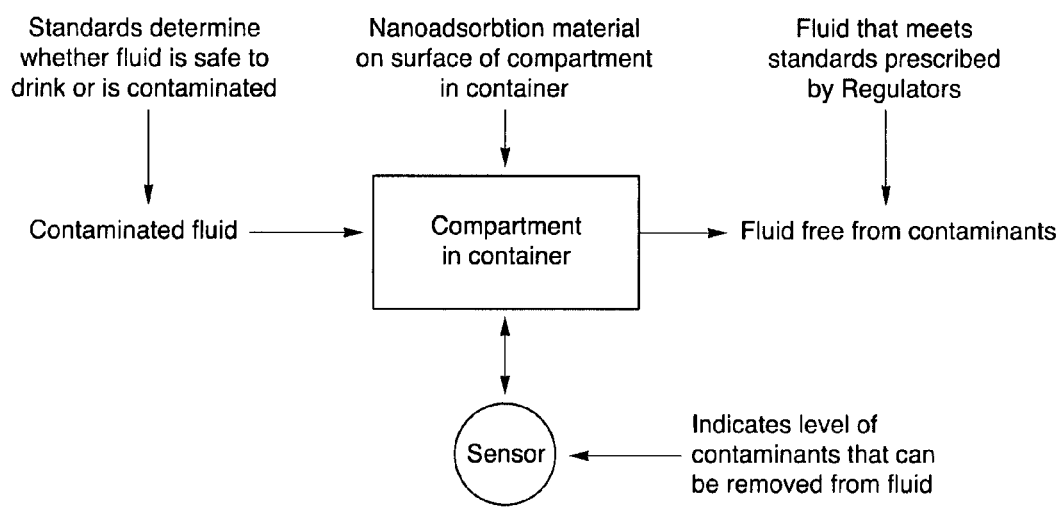
FIG. 4 illustrates schematically a process for removing contaminants from fluid in accordance with one embodiment of the present invention.

Referring now to FIG. 4, the system of the present invention may be used to purify fluid by removing particulates and/or contaminants from the fluid, such as water, when the levels of particulates and/or contaminants exceed the prescribed limits for fluid that is intended for human consumption. The limits of contaminants in the drinking fluids may be prescribed, for instance, by governmental regulators. In operation, fluid 41 that may include particulates and/or contaminants may be initially be introduced into a purification compartment positioned within the chamber of the container 42. Once introduced within the compartment, the fluid along with the molecules of contaminants therein, when coming into contact with the porous matrix having the nanostructured adsorption material (e.g., flowing against or across the contact surface of the porous matrix), may be directed into the pores of the nanostructured adsorption material, wherein the molecules of contaminants may be trapped. It should be noted that the movement of fluid within the compartment caused by or due to, for instance, the draining of purified or treated fluid 44 from the compartment, should be sufficient to direct the flow of contaminants into the pores. If the situation is such that there is little or no movement of fluid within the compartment (e.g., when a plate is situated across the outlet end 113), the contaminants may still be removed by slow molecular displacement or diffusion of molecules into the porous matrix within the compartment.

Since the phenomenon occurs at a molecular level, the particulates and/or contaminants typically cannot be released from the pores within which they are trapped without enormous pressure or the application of heat at elevated levels. As the particulates and/or contaminants enter and become trapped within the pores, the weight of nanostructured adsorption material can increase to a measurable difference. Such an increase can be detected and displayed, for example, by a sensor, to indicate, for instance, the levels of contaminants removed from the fluid.

Accordingly, still referring to FIG. 4, a sensor 43 may be coupled to the compartment 42, such that the sensor 43 may be in communication with a porous matrix within the receptacle in order to display the levels of contaminants removed from the fluid. Sensor 43 can be any sensor which can detect a pressure, weight or heat differential between a porous matrix at time $t_o$ and the same porous matrix at time $t_n$, subsequent to exposure of the porous matrix to the fluid. In one embodiment, the sensor 43 may include pressure detector sufficiently thin (e.g., thin layer wired mesh or sheet), so as to be capable of being embedded within the nanostructured adsorption material of the porous matrix, and a display in communication with the detector. The pressure detector can act to transform the pressure differential between $t_o$ and $t_n$ into electrical signals that can subsequently be process and shown on the display as the amount of particulates or contaminants in the porous matrix or the amount of contaminant removed.

The sensor 43 may alternatively employ a weight sensor. It is noted that if at $t_o$ the weight of the porous matrix is x milligram, then at $t_n$, for instance, 15 seconds, when the nanostructured material of the porous matrix has had a chance to adsorb the particulates and/or contaminants, the weight of nanostructured adsorption material will be x+y, with y being the weight of contaminants that has been removed from the fluid. The weight increase due to the adsorption of the contaminants can be transformed to electrical signals, which can subsequently be displayed as information on a scale in terms of percentage of contaminants removed from the fluid.

The sensor 43 may also employ a heat sensor. If, for instance, at $t_o$ the temperature of the porous matrix is x degrees, then at $t_n$, for instance, 15 seconds, when the nanostructured material of the porous matrix has had a chance to adsorb the particulates and/or contaminants, the heat generated in the nanostructured adsorption material will be x+y, with y being the temperature increase due to the adsorption of contaminants in the nanostructured material. This temperature increase can be transformed to electrical signals, which can subsequently be displayed as information on a scale in terms of percentage of contaminants removed from the fluid.

Whether using the pressure, weight and/or heat detector, when the nanostructured adsorption material approaches about 90% its capacity level for trapping particulates and/or contaminants, the sensor 43, in one embodiment, can be designed to warn the user, for instance, by audio, visual, or other applicable indicators, that the porous matrix needs replacing or that the treating compartment can no longer be used, if the treating compartment is designed to be a disposable compartment.

The system of the present invention, accordingly, may be refilled over and over again with fluid to be treated. The system may be used successively to generate purified fluid meeting standards or limits prescribed for human consumption, until the nanostructured adsorption material of the porous matrix approaches its exhaustive capacity for trapping and retaining particles therein, i.e., having entrapped and retained therein particulates and/or contaminants at about 90% of its capacity.

The porous matrix of the present invention may be designed for easy removal from the filtering compartment when the matrix has substantially reached its exhaustive capacity. To that end, looking again at FIG. 1A, the porous matrix 20, made from a nanostructured adsorption material, may be adhered directly onto walls 16 of the compartment 11. In particular, the porous matrix may be provided as a sheet of material that can be adhered to the walls 16 of compartment 11. Alternatively, the porous matrix may be coated onto walls 16 as a thin film or layer. Regardless of the adherence mechanism, it should be one that is non-degradable in the presence of fluid. In either embodiment, the thin film or sheet of porous matrix may be designed so that it is sufficiently flexible and pliable for removal or insertion into the compartment 11.

In accordance with another embodiment, the porous matrix 20 may be embedded within the compartment walls 16, so that contact surface 24 of the matrix 20 may be exposed to the fluid within the compartment 11, while substantially impermeable surface 25 may be positioned against chamber walls 16. In an embodiment, the porous matrix 20 may be embedded within the walls substantially circumferentially about the compartment 11. The matrix may be designed to extend partially up walls 16, should it be desired, or may be permitted to extend substantially along the length of walls 16. To embed the porous matrix 20 within the walls 16, means known in the art may be employed, for instance, co-extrusion of the porous matrix 20 along with the material comprising compartment 11. In one embodiment of the present invention, porous matrix 20 may be provided with a thickness ranging from about 0.20 mm to about 0.30 mm.

Figure 5:
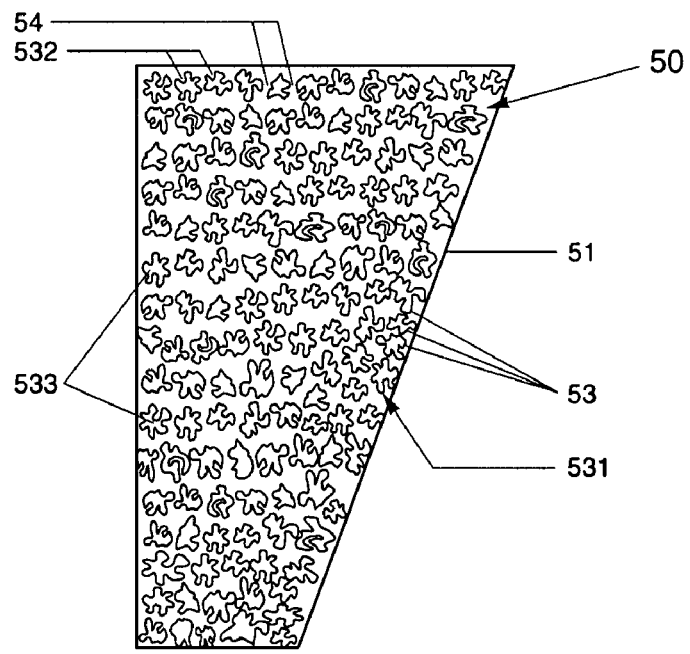
FIG. 5 illustrates a porous matrix in accordance with another embodiment of the present invention.

Looking now at FIG. 5, a porous matrix 50, made from a nanostructured adsorption material, and in accordance with this particular embodiment of the present invention, may be provided as a loose mass of macro particles 53 that can freely move within compartment 51 of a fluid container. Each of the particles 53 may include a contact surface 531 having a plurality of nanoscaled pores 532 and an impermeable core 533, so that fluid may be prevented from flowing through the particles 53. The particles 53, in one embodiment, may be uniform in size and shape, or as illustrated, vary in size and shape. In an embodiment, the size of the particles 53 may range from about 0.001 millimeter (mm) to about 10 mm, and may be provided in sufficient amount to substantially fill compartment 51. The placement of such an amount within compartment 51 can create channels 54 between the particles 53, so that fluid within the compartment 51 may flow through the channels 54. It should be appreciated that as the fluid flows along the channels 54, the fluid flows pass the contact surface 531 to permit the pores 532 in the contact surface 531 to entrap and retain particulates and/or contaminants within the pores 532.

Figure 6:
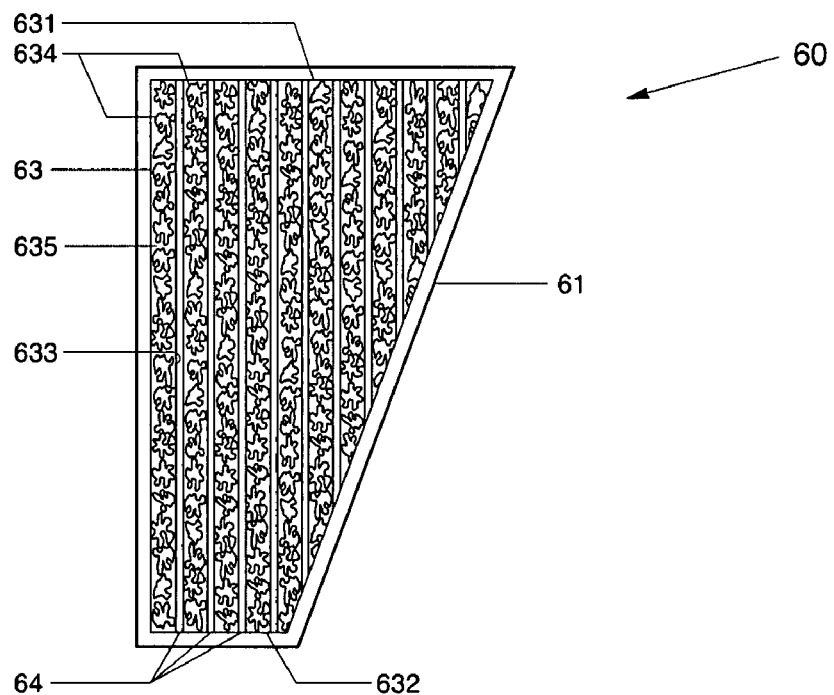
FIG. 6 illustrates a porous block matrix in accordance with a further embodiment of the present invention.

In an alternate embodiment, referring now to FIG. 6, a porous matrix 60 made from a nanostructured adsorption material in a shape of a block 63 may be provided within compartment 61 of a fluid container. Block 63, in one embodiment, may include a plurality of channels 64 extending substantially from one of its end 631 to an opposite end 632. The number of channels 64 may vary so as to provide the block 63 with a porosity ranging from about 10 percent to about 90 percent. The block 63 may also include a contact surface 633 provided circumferentially along each channel 64, a plurality of nanoscaled pores 634 extending into the block 63 and away from the surface 633, and an impermeable core 635 in the area between any two adjacent channels 64. In this manner, fluid flowing through a channel 64 can be prevented from flowing over to an adjacent channel 64 to permit the pores 634 along the contact surface 633 within each channel to entrap and retain particulates and/or contaminants within the pores on the block 63. Although illustrated as substantially conforming to the compartment 61, the block 63, in an embodiment, may be provided with any size or shape, so long as it permits fluid to flow therethrough (see FIG. 7). Of course, block 63 may also not need to conform to the shape of compartment 61, so long as it permits fluid to flow therethrough.

In accordance with one embodiment, similar to the porous matrix 20 above, performance of porous matrix 50 and/or 60 may be enhanced by impregnating the pores of the matrix with silver, silver compound(s), copper, zinc and/or other compounds such as ferric oxide, so as to minimize microbial growth, aid in the killing of microorganisms and viruses, and/or aid in the removal of inorganic contaminants. Of course, it is not necessary that the matrix be impregnated with such compounds.

Referring again to FIG. 1A, the container 10 of the present invention may include a handle 17 for lifting and handling of the container. Handle 17, of course, can be of any geometric shape or size to permit handling of the container. The container may further include a lip 18 at its top end to facilitate pouring of the treated fluid from within the chamber and to minimize any spilling. As the container 10 needs to accommodate a substantial amount of fluid and withstand a good deal of handling, the container 10, in an embodiment, may be made from a strong and rigid material. Examples of a material from which the container 10 may be made includes plastics, molded plastics, metal, a combination thereof or any other strong and rigid material. To the extent desired, the container 10 may be made from a transparent material to permit the user to see the amount of remaining treated fluid in the chamber before making a decision whether to add more fluid to be treated into the compartment 11.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains, and as fall within the scope of the appended claims.

What is claimed is:

1. A container for purification of fluid, the container comprising:
    a chamber into which treated fluid may be accommodated;
    a compartment for receiving fluid to be treated and being positioned within the chamber against a wall of the container to permit draining of the treated fluid into the chamber;
    and
    a porous matrix being positioned within the compartment having a contact surface, having a plurality of nanoscale pores dispersed therein, and an impermeable surface such that fluid having particulates and/or contaminants coming into contact with the contact surface of the matrix flows back out along the same surface of the matrix substantially without the particulates and contaminants.

2. A container as set forth in claim 1, wherein the compartment includes an outlet end through which treated fluid drains into the chamber.

3. A container as set forth in claim 2, wherein the outlet end permits the fluid to remain within the compartment for a period of time sufficient for treatment prior to draining into the chamber.

4. A container as set forth in claim 2, wherein the outlet end includes at least one opening sufficiently sized to permit the fluid to remain within the compartment for a period of time sufficient for treatment prior to draining into the chamber.

5. A container as set forth in claim 1, wherein the compartment tapers from its inlet end towards its outlet end, so as to facilitate migration of fluid from within the compartment towards the outlet end.

6. A container as set forth in claim 1, wherein the compartment is removable positioned against the wall of the container.

7. A container as set in claim 1, wherein the nanoscale pores of the porous matrix are dispersed between the fluid contact surface across which fluid may flow and the substantially impermeable surface.

8. A container as set forth in claim 1, wherein the plurality of nanoscaled pores within the porous matrix have sizes ranging from about 1 nm to about 100 nm.

9. A container as set forth in claim 1, wherein the plurality of nanoscaled pores are arranged in distinct layers according to range of size.

10. A container as set forth in claim 1, wherein the porous matrix includes within the pores of the matrix one of silver, silver compound, copper, zinc, ferric oxide or a combination thereof, so as to minimize microbial growth, aid in the killing of microorganisms and viruses, or aid in the removal of inorganic contaminants within the matrix.

11. A container as set forth in claim 1, wherein the matrix is positioned against walls of the compartment with the surface across which fluid flows exposed to the fluid within the compartment.

12. A container as set forth in claim 1, wherein the matrix is embedded within walls of the compartment with the surface across which fluid flows exposed to the fluid within the compartment.

13. A container as set forth in claim 1, wherein the matrix comprises a loose mass of macro particles within the compartment, the macro particles having a fluid impermeable core and a contact surface with nanoscaled pores.

14. A container as set forth in claim 13, wherein placement of the macro particles within the compartment provides a plurality of channels between adjacent particles to permit fluid to flow therethrough and against the contact surface of the particles.

15. A container as set forth in claim 1, further including, across its upper end, a lid to minimize spilling of fluid from within the chamber.

16. A container as set forth in claim 15, wherein the lid includes a movable cover positioned substantially over a location at which the compartment is situated within the chamber to facilitate pouring of fluid into the compartment.

17. A container as set forth in claim 1, further including a sensor for detecting the amount of particulates removed from the fluid.

18. A container as set forth in claim 1, further including a sensor for warning the user when the porous matrix approaches its capacity to trap and retain particulates therein.

19. A container for purification of fluid, the container comprising:
    a chamber into which treated fluid may be accommodated;
    a compartment for receiving fluid to be treated and being positioned within the chamber against a wall of the container to permit draining of treated fluid into the chamber; and
    a porous matrix being positioned within the compartment and having a plurality of nanoscaled pores dispersed therein, such that fluid having particulates and/or contaminants coming into contact with one surface of the matrix flows back out along the same surface of the matrix substantially without the particulates and contaminants;
    wherein the matrix comprises a block having:
    a plurality of channels extending from one end of the block to an opposite end, so that fluid in the compartment can flow therethrough;
    a contact surface provided circumferentially along each channel to against which fluid in the channels can flow;
    a plurality of nanoscaled pores extending into the block and away from the surface to entrap and retain particulates and contaminants within the pores; and an impermeable core in an area between any two adjacent channels to prevent fluid from flowing from one channel to an adjacent channel.

20. A container as set forth in claim 19, wherein the number of channels may vary so as to provide the block with a porosity ranging from about 10 percent to about 90 percent.

21. A method for purification of a fluid, the method comprising:
    providing a compartment within which fluid to be treated may be received;
    placing, within the compartment, a porous matrix having a plurality of nanoscaled pores dispersed between a fluid contact surface and a fluid impermeable surface, such that fluid having particulates and/or contaminants flowing across the fluid contact surface of the matrix flows back out along the same fluid contact surface of the matrix substantially without the particulates and/or contaminants;
    aligning a chamber with the compartment;
    introducing fluid to be treated into the compartment;
    facilitate fluid flow across the fluid contact surface of the porous matrix and into the pores, so as to allow particulates and/or contaminants in the fluid to be trapped within the pores; and
    allowing the treated fluid to be drained from the compartment into the chamber.

22. A method as set forth in claim 21, further including determining the amount of particulates and/or contaminants removed from the fluid.

23. A method as set forth in claim 21, further including notifying the user when the porous matrix approaches its capacity for trapping and retaining particulates and/or contaminants therein.

24. A method as set forth in claim 21, further including replacing the porous matrix when the matrix approaches its capacity for trapping and retaining particulates and/or contaminants therein.

25. A method as set forth in claim 21, further disposing the compartment along with the porous matrix when the matrix approaches its capacity for trapping and retaining particulates and/or contaminants therein.

26. A kit for use in removing particulates from a fluid, the kit comprising:
    a compartment capable of being positioned against a wall of a container, the compartment being designed to received therein fluid to be treated; and
    a porous matrix for placement within the compartment, the matrix having a plurality of nanoscaled pores dispersed between a fluid contact surface and a fluid impermeable surface, such that fluid having particulates and/or contaminants flowing across the fluid contact surface of the matrix flows back out along the same fluid contact surface of the matrix substantially without the particulates and/or contaminants.

27. A kit as set forth in claim 26, wherein the matrix comprises a sheet.

28. A kit as set forth in claim 26, wherein the matrix comprises a loose mass of macro particles, each macro particles having a fluid impermeable core and a contact surface with nanoscaled pores.

29. A kit as set forth in claim 26, wherein the matrix comprises block having:
    a plurality of channels extending from one end of the block to an opposite end, so that fluid in the compartment can flow therethrough;
    a plurality of nanoscaled pores extending into the block and away from a surface of each channel; and
    an impermeable core in an area between any two adjacent channels.

30. A porous matrix for purification of a fluid, the matrix comprising:
    a loose mass of macro particles, each having a fluid impermeable core and a contact surface with nanoscaled pores.
    a plurality of channels between adjacent particles, when the particles are packed against one another, to permit fluid to flow therethrough and against the contact surface of the particles, such that fluid having particulates and/or contaminants coming into contact with one surface of a particle flows back out along the same surface of the particle substantially without the particulates and contaminants.

31. A porous matrix for purification of a fluid, the matrix comprising:
    a plurality of channels extending from one end of a block to an opposite end, so that fluid in a compartment within which the block is positioned can flow therethrough;
    a contact surface provided circumferentially along each channel against which fluid in the channels can flow;
    a plurality of nanoscaled pores extending into the block and away from the surface to entrap and retain particulates and contaminants within the pores; and an impermeable core in an area between any two adjacent channels to prevent fluid from flowing from one channel to an adjacent channel.

* * * * *